United States Patent Office 3,453,297
Patented July 1, 1969

3,453,297
17α-LOWER ALKOXY-PREGNA-4,6-DIENE-3,20-DIONE STEROIDS
Frances G. Hoffman, Newark, N.J., assignor to Merck & Co., Inc., Rahway, N.J., a corporation of New Jersey
No Drawing. Continuation of application Ser. No. 494,895, Oct. 11, 1965. This application July 24, 1968, Ser. No. 750,424
Int. Cl. C07c *169/34;* A61k *17/06*
U.S. Cl. 260—397.4           8 Claims This application is a continuation of application Ser. No. 494,895 filed Oct. 11, 1965 now abandoned.

This invention relates to valuable new steroids and the preparation thereof. More particularly, this invention relates to 17α-alkoxy steroids of the 4,6-pregnadiene-3,20-dione series, which in addition may have a 16α- or 16β-methyl substituent, a β-hydroxy or keto substituent on the 11-carbon atom, an α-fluorine substituent on the 9-carbon atom when a β-hydroxy or keto substituent is present on the 11-carbon atom, a methyl, chlorine or fluorine substituent on the 6-carbon atom, and a fluorine substituent on the 21-carbon atom, and to a method for the preparation thereof.

The valuable new steroids to which this invention relates may be chemically represented as follows:

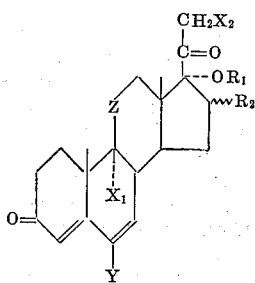

wherein $R_1$ is a lower alkyl radical having not more than five carbon atoms; $R_2$ is hydrogen or methyl; $X_1$ is hydrogen or fluorine; $X_2$ is hydrogen or fluorine, $X_1$ being fluorine only if Z is β-hydroxy methylene or carbonyl; Y is hydrogen, chlorine, fluorine or methyl; and Z is methylene, β-hydroxy methylene or carbonyl; it being preferred that Z is methylene and $X_1$ is hydrogen if $R_2$ is hydrogen. More particularly, the alkoxy group of the 17α-alkoxy-pregna-4,6-diene-3,20-dione steroids may be methoxy, ethoxy, propoxy, isopropoxy, butoxy, isobutoxy, allyloxy, or pentoxy group and the 17α-alkoxy-pregna-4,6-diene-3,20-dione steroids may be substituted at various positions, for example, substituted at the 6-position with a methyl, chloro or fluoro group, at the 11-position with a β-hydroxy or keto group, at the 9α-position with a fluoro group when a β-hydroxy or keto group is present at the 11-position, at the 16-position with a methyl group, and at the 21-position with a fluoro group to provide the following groups of compounds:

17α-alkoxy-4,6-pregnadiene-3,20-dione steroids,
16α- or 16β-methyl-17α-alkoxy-4,6-pregnadiene-3,20-dione steroids,
16α- or 16β-methyl-17α-alkoxy-21-fluoro-4,6-pregnadiene-3,20-dione steroids,
11β-hydroxy-17α-alkoxy-4,6-pregnadiene-3,20-dione steroids,
11β-hydroxy-17α-alkoxy-21-fluoro-4,6-pregnadiene-3,20-dione steroids,
11β-hydroxy-16α-methyl-17α-alkoxy-4,6-pregnadiene-3,20-dione steroids,
11β-hydroxy-16α-methyl-17α-alkoxy-21-fluoro-4,6-pregnadiene-3,20-dione steroids,
17α-alkoxy-4,6-pregnadiene-3,11,20-trione steroids,
17α-alkoxy-21-fluoro-4,6-pregnadiene-3,11,20-trione steroids,
16α-methyl-17α-alkoxy-4,6-pregnadiene-3,11,20-trione steroids,
16α-methyl-17α-alkoxy-21-fluoro-4,6-pregnadiene-3,11,20-trione steroids,
9α-fluoro-11β-hydroxy-17α-alkoxy-4,6-pregnadiene-3,20-dione steroids,
9α-fluoro-11β-hydroxy-17α-alkoxy-21-fluoro-4,6-pregnadiene-3,20-dione steroids,
9α-fluoro-11β-hydroxy-16α-methyl-17α-alkoxy-4,6-pregnadiene-3,20-dione steroids,
9α-fluoro-11β-hydroxy-16α-methyl-17α-alkoxy-21-fluoro-4,6-pregnadiene-3,20-dione steroids,
9α-fluoro-17α-alkoxy-4,6-pregnadiene-3,11,20-trione steroids,
9α-fluoro-17α-alkoxy-21-fluoro-4,6-pregnadiene-3,11,20-trione steroids,
9α-fluoro-16α-methyl-17α-alkoxy-4,6-pregnadiene-3,11,20-trione steroids,
9α-fluoro-16α-methyl-17α-alkoxy-21-fluoro-4,6-pregnadiene-3,11,20-trione steroids,
6-methyl, chloro or fluoro-17α-alkoxy-4,6-pregnadiene-3,20-dione steroids,
6-methyl, chloro or fluoro-17α-alkoxy-21-fluoro-4,6-pregnadiene-3,20-dione steroids,
6-methyl, chloro or fluoro-16α-methyl-17α-alkoxy-4,6-pregnadiene-3,20-dione steroids,
6-methyl, chloro or fluoro-16α-methyl-17α-alkoxy-21-fluoro-4,6-pregnadiene-3,20-dione steroids,
6-methyl, chloro or fluoro-11β-hydroxy-17α-alkoxy-4,6-pregnadiene-3,20-dione steroids,
6-methyl, chloro or fluoro-11β-hydroxy-17α-alkoxy-21-fluoro-4,6-pregnadiene-3,20-dione steriods,
6-methyl, chloro or fluoro-11β-hydroxy-16α-methyl-17α-alkoxy-4,6-pregnadiene-3,20-dione steroids,
6-methyl, chloro or fluoro-11β-hydroxy-16α-methyl-17α-alkoxy-21-fluoro-4,6-pregnadiene-3,20-dione steroids,
6-methyl, chloro or fluoro-17α-alkoxy-4,6-pregnadiene-3,11,20-trione steroids,
6-methyl, chloro or fluoro-17α-alkoxy-21-fluoro-4,6-pregnadiene-3,11,20-trione steroids,
6-methyl, chloro or fluoro-16α-methyl-17α-alkoxy-4,6-pregnadiene-3,11,20-trione steroids,
6-methyl, chloro or fluoro-16α-methyl-17α-alkoxy-21-fluoro-4,6-pregnadiene-3,11,20-trione steroids,
6-methyl, chloro or fluoro-9α-fluoro-11β-hydroxy-17α-alkoxy-4,6-pregnadiene-3,20-dione steroids,
6-methyl, chloro or fluoro-9α-fluoro-11β-hydroxy-17α-alkoxy-21-fluoro-4,6-pregnadiene-3,20-dione steroids,
6-methyl, chloro or fluoro-9α-fluoro-11β-hydroxy-16α-methyl-17α-alkoxy-4,6-pregnadiene-3,20-dione steroids,
6-methyl, chloro or fluoro-9α-fluoro-11β-hydroxy-16α-methyl-17α-alkoxy-21-fluoro-4,6-pregnadiene-3,20-dione steroids,
6-methyl, chloro or fluoro-9α-fluoro-17α-alkoxy-4,6-pregnadiene-3,11,20-trione steroids, 6-methyl, chloro or fluoro-9α-fluoro-17α-alkoxy-21-fluoro-4,6-pregnadiene-3,11,20-trione steroids, 6-methyl, chloro or fluoro-9α-fluoro-16α-methyl-17α-alkoxy-4,6-pregnadiene-3,11,20-trione steroids, 6-methyl, chloro or fluoro-9α-fluoro-16α-methyl-17α-alkoxy-21-fluoro-4,6-pregnadiene-3,11,20-trione steroids.

The novel compounds of this invention have utility as progestational agents and because of this property they may be used to regulate the estrus cycle in domestic animals and in cases of menstrual disturbances may be used to re-establish the normal relationships between the anteriorpituitary, ovary and endometrium which are present in a normal estrus cycle. They may also be used to synchronize the estrus cycles of a herd or colony of domestic animals or to chronically suppress estrus in domestic animals. When used for these purposes, the novel compounds may be supplied together or in succession with an estrogenic hormone.

Because of the progesterone-like effects of the novel compounds of this invention, they affect the secretion of gonadotropins and thus act to regulate ovulation and endometrial and placental development. When combined with estrogens or androgens, the novel compounds of this invention reduce fertility. The novel compounds of this invention also have utility in correcting disorders such as dysmenorrhea, amenorrhea, threatened abortion, endometriosis, and the like.

The novel compounds of this invention may be administered orally or parenterally and for this purpose a wide variety of oral or parenteral dosage forms may be used in which they may be present singly, or in admixture with another active ingredient, such as an estrogen. In the various dosage forms, they can be combined or absorbed on an inert solid diluent or dissolved, dispersed or suspended in a suitable liquid carrier. When combined with an inert solid diluent, they may be in suitable dosage unit form, more particularly in the form of a tablet, powder, capsule, tampon or the like. When combined with a liquid diluent, the composition may be in the form of a solution, emulsion, suspension or the like. The novel compounds of this invention may also be formulated into an ointment, cream, lotion, or the like, which is suitable for topical administration, and in this form they may be combined with an additional active ingredient, such as an antibiotic, germicide or the like.

In preparing the novel steroid compounds, the starting material utilized is a 17α-alkoxy-4-pregnene-3,20-dione represented by the following structural formula:

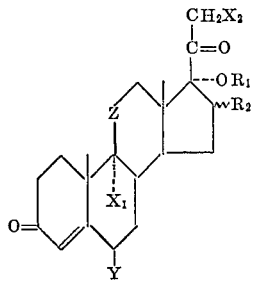

wherein $R_1$ is a lower alkyl radical having not more than five carbon atoms; $R_2$ is hydrogen or methyl; $X_1$ is hydrogen or fluorine; $X_2$ is hydrogen or fluorine; Y is hydrogen, chlorine, fluorine or methyl; and Z is methylene, β-hydroxy methylene or carbonyl; it being preferred that Z is methylene and $X_1$ is hydrogen if $R_2$ is hydrogen and $X_1$ being fluorine only if Z is β-hydroxy methylene or keto. The 17α-alkoxy-4-pregnene-3,20-dione starting compounds are conveniently converted to the corresponding 17α-alkoxy-4,6-pregnadiene-3,20-dione steroids by reaction with chloranil. This reaction is readily carried out by dissolving the steroid starting material in a suitable solvent such as ethyl acetate, tertiary-butanol, acetone, dioxane, or the like, and reacting this solution with chloranil at reflux temperature for a period of 12 to 24 hours under a nitrogen atmosphere, preferably in the presence of a small amount of added acid, such as acetic acid, propionic acid, or anhydrous hydrochloric acid. The desired product is advantageously recovered by concentrating the reaction mixture to dryness and chromatographing the residue.

The starting materials of the above chemical formula may be readily prepared by converting the corresponding 17α-hydroxy steroids to the 17α-alkoxy steroid derivatives by the use of a suitable etherification procedure.

The following examples illustrate methods of carrying out the present invention, but it is to be understood that these examples are given for purposes of illustration and not of limitation.

Example 1.—17α-methoxy-4,6-pregnadiene-3,20-dione

A suspension of 17α-methoxy-4-pregnene-3,20-dione (100 mg.) and chloranil (200 ml.) in 2.3 ml. of ethyl acetate and 0.5 ml. of acetic acid is heated under reflux overnight, protected by a blanket of nitrogen. The solvent is removed and the residue of the solvent is dissolved in chloroform. The resulting solution is washed successively with 10% aqueous sodium bisulfite solution, 5% potassium hydroxide, and then water. The solution is dried over sodium sulfate and concentrated under reduced pressure to give 17α-methoxy-4,6-pregnadiene-3,20-dione which is purified by chromatography.

In accordance with the foregoing procedure, but starting with 17α-ethoxy-4-pregnene-3,20-dione, there is obtained the corresponding 17α-ethoxy-4,6-pregnadiene-3,20-dione.

The 17α - methoxy - 4 - pregnene - 3,20 - dione used as the starting material can be prepared as follows:

A mixture of 100 mg. of 4-pregnene-17α-ol-3,20-dione, 5.0 ml. of methyl iodide and 300 mg. of silver oxide prepared, for example, by precipitation of a warm aqueous solution of silver nitrate with approximately one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina. The eluate from the chromatograph column having a solvent composition of ether:petroleum ether (3:7) to (1:9) contains the desired 17α-methoxy-4-pregnene-3,20-dione. The product is recovered and purified by evaporation of the solvent from the eluate fraction and recrystallization of the residue.

In accordance with the foregoing procedure, but using ethyl iodide in place of methyl iodide, there is obtained the corresponding 17α-ethoxy-4-pregnene-3,20-dione.

Example 2.—16α-methyl-17α-methoxy-4,6-pregnadiene-3,20-dione

A suspension of 100 mg. of 16α-methyl-17α-methoxy-4-pregnene-3,20-dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 16α-methyl-17α-methoxy-4,6-pregnadiene-3,20-dione, which is purified by chromatography.

In accordance with the foregoing procedure, but starting with 16α - methyl-17α-ethoxy-4-pregnene-3,20-dione, the corresponding 16α-methyl-17α-ethoxy-4,6-pregnadiene-3,20-dione is obtained.

Example 3.—16α-methyl-17α-methoxy-21-fluoro-4,6-pregnadiene-3,20-dione

A suspension of 100 mg. of 16α-methyl-17α-methoxy-21-fluoro-4-pregnene-3,20-dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 16α-methyl - 17α - methoxy - 21 - fluoro - 4,6 - pregnadiene - 3,20-dione, which is purified by chromatography.

In accordance with the foregoing procedure, but starting with 16α - methyl - 17α - ethoxy - 21 - fluoro - 4 - pregnene - 3,20 - dione, the corresponding 16α - methyl-17α - ethoxy -21 - fluoro - 4,6 - pregnadiene - 3,20 - dione is obtained.

Example 4.—11β-hydroxy-16α-methyl-17α-methoxy-4,6-pregnadiene-3,20-dione

A suspension of 100 mg. of 11β-hydroxy-16α-methyl-17α - methoxy - 4 - pregnene - 3,20 - dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 11β - hydroxy-16α-methyl-17α-methoxy-4,6-pregnadiene-3,20-dione, which is purified by chromatography.

In accordance with the foregoing procedure, but starting with 11β - hydroxy - 16α - methyl - 17α - ethoxy - 4 - pregnene-3,20-dione, the corresponding 11β-hydroxy-16α-methyl - 17α - ethoxy - 4,6 - pregnadiene-3,20-dione is obtained.

Example 5.—11β-hydroxy-16α-methyl-17α-ethoxy-21-fluoro-4,6-pregnadiene-3,20-dione A suspension of 100 mg. of 11β-hydroxy-16α-methyl-17α-ethoxy-21-fluoro-4-pregnene-3,20-dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 11β-hydroxy-16α-methyl-17α-ethoxy-21-fluoro - 4,6 - pregnadiene-3,20-dione, which is purified by chromatography.

In accordance with the foregoing procedure, but starting with 11β-hydroxy - 16α - methyl - 17α - propoxy - 21-fluoro-4-pregnene-3,20-dione, the corresponding 11β-hydroxy-16α-methyl-17α - propoxy - 21 - fluoro - 4,6 - pregnadiene-3,20-dione is obtained.

Example 6.—16α-methyl-17α-ethoxy-4,6-pregnadiene-3,11,20-trione

A suspension of 100 mg. of 16α-methyl-17α-ethoxy-4-pregnene-3,11,20-trione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 16α-methyl-17α-ethoxy-4,6-pregnadiene-3,11,20-trione, which is purified by chromatography.

In accordance with the foregoing procedure, but starting with 16α-methyl-17α-butoxy-4-pregnene-3,11,20 - trione, the corresponding 16α-methyl-17α-butoxy-4,6-pregnadiene-3,11,20-trione is obtained.

Example 7.—16α-methyl-17α-ethoxy-21-fluoro-4,6-pregnadiene-3,11,20-trione

A suspension of 100 mg. of 16α-methyl-17α-ethoxy-21-fluoro-4-pregnene-3,11,20-trione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 16α - methyl - 17α - ethoxy - 21 - fluoro - 4,6 - pregnadiene-3,11,20-trione, which is purified by chromatography.

In accordance with the foregoing procedure, but starting with 16α-methyl-17α-isopropoxy-21 - fluoro - 4 - pregnene-3,11,20-trione, the corresponding 16α-methyl-17α-isopropoxy-21-fluoro-4,6-pregnadiene - 3,11,20 - trione is obtained.

Example 8.—9α-fluoro-11β-hydroxy-16α-methyl-17α-methoxy-4,6-pregnadiene-3,20-dione A suspension of 100 mg. of 9α-fluoro-11β-hydroxy-16α-methyl - 17α - methoxy - 4 - pregnene - 3,20 - dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washer with 10% aqueous sodium bisulfite solution, then with 5% aqueous potassium hydroxide solution, and finally with water. The chloroform solution is dried over sodium sulfate and concentrated to dryness under reduced pressure. The residue is 9α-fluoro-11β-hydroxy-16α-methyl - 17α - methoxy-4,6-pregnadiene-3,20-dione, which is purified by chromatography.

In accordance with the foregoing procedure, but starting with 9α-fluoro-11β-hydroxy-16α-methyl-17α - ethoxy-4-pregnene-3,20-dione, the corresponding 9α-fluoro-11β-hydroxy-16α-methyl-17α-ethoxy - 4,6 - pregnadiene-3,20-dione is obtained.

Example 9.—9α-fluoro-11β-hydroxy - 16α - methyl - 17α-methoxy-21-fluoro-4,6-pregnadiene-3,20-dione A suspension of 100 mg. of 9α-fluoro-11β-hydroxy-16α-methyl-17α-methoxy-4-pregnene-3,20-dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is dried over sodium sulfate and concentrated to dryness under reduced pressure. The residue is 9α-fluoro-11β-hydroxy-16α-methyl-17α - methoxy - 21-fluoro-4,6-pregnadiene-3,20-dione, which is purified by chromatography.

In accordance with the foregoing procedure, but starting with 9α-fluoro-11β-hydroxy-16α-methyl-17α - ethoxy-4-pregnene-3,20-dione, the corresponding 9α-fluoro-11β-hydroxy - 16α - methyl - 17α - ethoxy - 4,6 - pregnadiene-3,20-dione is obtained.

Example 10.—9α-fluoro-16α-methyl-17α-ethoxy-4,6-pregnadiene-3,11,20-trione

A suspension of 100 mg. of 9α-fluoro-16α-methyl-17α-ethoxy-4-pregnene-3,11,20-trione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 9α-fluoro-16α-methyl-17α-ethoxy-4,6-pregnadiene-3,11,20-trione, which is purified by chromatography.

In accordance with the foregoing procedure, but starting with 9α-fluoro-16α-methyl-17α-propoxy-4-pregnene-3,11,20-trione, the corresponding 9α-fluoro-16α-methyl-17α-propoxy-4,6-pregnadiene-3,11,20-trione is obtained.

Example 11.—9α-fluoro-16α-methyl-17α-ethoxy-21-fluoro-4,6-pregnadiene-3,11,20-trione A suspension of 100 mg. of 9α-fluoro-16α-methyl-17α-ethoxy-21-fluoro-4-pregnene-3,11,20-trione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 9α-fluoro-16α - methyl - 17α - ethoxy - 21 - fluoro - 4,6 - pregnadiene-3,11,20-trione, which is purified by chromatography.

In accordance with the foregoing procedure, but starting with 9α-fluoro-16α-methyl-17α-pentoxy-21-fluoro-4-pregnene-3,11,20-trione, the corresponding 9α-fluoro-16α-methyl - 17α - pentoxy - 21 - fluoro - 4,6 - pregnadiene-3,11,20-trione is obtained.

Example 12.—6-methyl-16α-methyl-17α-ethoxy-4,6-pregnadiene-3,20-dione

A suspension of 100 mg. of 6-methyl-16α-methyl-17α-ethoxy-4-pregnene-3,20-dione and 200 ml. of chloranil in 2.3 ml. of ethyl acetate and 0.5 ml. of acetate acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 6-methyl-16α-methyl-17α-ethoxy-4,6-pregnadiene-3,20-dione, which is purified by chromatography.

In accordance with the foregoing procedure, but starting with 6-methyl-16α-methyl-17α-propoxy-4-pregnene-3,20-dione, the corresponding 6-methyl-16α-methyl-17α-propoxy-4,6-pregnadiene-3,20-dione is obtained.

Example 13.—6-methyl-16α-methyl-17α-methoxy-21-fluoro-4,6-pregnadiene-3,20-dione A suspension of 100 mg. of 6-methyl-16α-methyl-17α-methoxy-21-fluoro-4-pregnene-3,20-dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 6-methyl-16α - methyl - 17α - methoxy - 21 - fluoro - 4,6 - pregnadiene-3,20-dione, which is purified by chromatography.

In accordance with the foregoing procedure, but starting with 6-methyl-16α-methyl-17α-ethoxy-21-fluoro-4-pregnene-3,20-dione, the corresponding 6-methyl-16α-methyl-17α-ethoxy-21-fluoro-4,6-pregnadiene-3,20-dione is obtained.

Example 14.—6-methyl-11β-hydroxy-16α-methyl-17α-methoxy-4,6-pregnadiene-3,20-dione A suspension of 100 mg. of 6-methyl-11β-hydroxy-16α-methyl-17α-methoxy-4-pregnene-3,20-dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 6-methyl-11β - hydroxy - 16α - methyl - 17α - methoxy - 4,6 - pregnadiene-3,20-dione, which is purified by chromatography.

In accordance with the foregoing procedure, but starting with 6-methyl-11β-hydroxy-16α-methyl-17α-ethoxy-4-pregnene-3,20-dione, the corresponding 6-methyl-11β-hydroxy - 16α - methyl - 17α - ethoxy - 4,6 - pregnadiene-3,20-dione is obtained.

Example 15.—6-methyl-11β-hydroxy-16α-methyl-17α-methoxy-21-fluoro-4,6-pregnadiene-3,20-dione A suspension of 100 mg. of 6-methyl-11β-hydroxy-16α-methyl-17α-methoxy-21-fluoro-4-pregnene-3,20-dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 6-methyl-11β-hydroxy-16α-methyl-17α-methoxy-21-fluoro-4,6-pregnadiene-3,20-dione, which is purified by chromatography.

In accordance with the foregoing procedure, but starting with 6α-methyl-11β-hydroxy-16α-methyl-17α-ethoxy-21-fluoro-4-pregnene - 3,20 - dione, the corresponding 6α-methyl-11β-hydroxy-16α-methyl-17α - ethoxy - 21 - fluoro - 4,6-pregnadiene-3,20-dione is obtained.

Example 16.—6-methyl-16α-methyl-17α-ethoxy-4,6-pregnadiene-3,11-20-trione

A suspension of 100 mg. of 6-methyl-16α-methyl-17α-ethoxy-4-pregnene-3,11,20-trione and 200 ml. of choranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 6-methyl-16α-methyl-17α-ethoxy-4,6-pregnadiene - 3,11,12 - trione, which is purified by chromatography.

In accordance with the foregoing procedure, but starting with 6-methyl-16α-methyl-17α-propoxy-4-pregnene-3,11,20-trione, the corresponding 6-methyl-16α-methyl-17α-propoxy-4,6-pregnadiene-3,11,20-trione is obtained.

Example 17.—6-methyl-16α-methyl-17α-ethoxy-21-fluoro-4,6-pregnadiene-3,11,20-trione A suspension of 100 mg. of 6-methyl-16α-methyl-17α-ethoxy-21-fluoro-4-pregnene-3,11,20-trione and 200 ml. of choranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced presusre. The residue is 6-methyl-16α-methyl-17α-ethoxy-21-fluoro-4,6 - pregnadiene - 3,11, 20-trione, which is purified by chromatography.

In accordance with the foregoing procedure, but starting with 6-methyl-16α-methyl-17α-butoxy - 21 - fluoro - 4-pregnene-3,11,20-trione, the corresponding 6-methyl-16α-methyl-17α-butoxy-21-fluoro-4,6-pregnadiene-3,11,20 - trione is obtained.

Example 18.—6-methyl-9α-fluoro-11β-hydroxy-16α-methyl-17α-methoxy-4,6-pregnadiene-3,20-dione A suspension of 100 mg. of 6-methyl-9α-fluoro-11β-hydroxy-16α-methyl-17α-methoxy-4-pregnene-3,20-dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 6-methyl-9α-fluoro-11β-hydroxy-16α-methyl - 17α - methoxy-4,6-pregnadiene-3,20-dione, which is purified by chromatography.

In accordance with the foregoing procedure, but starting with 6-methyl-9α-fluoro-11β-hydroxy-16α-methyl-17α-ethoxy-4-pregnene-3,20-dione, the corresponding 6-methyl-9α-fluoro-11β-hydroxy-16α-methyl - 17α - ethoxy - 4,6-pregnadiene-3,20-dione is obtained.

Example 19.—6-methyl-9α-fluoro-11β-hydroxy-16α-methyl-17α-ethoxy-21-fluoro-4,6-pregnadiene-3,20-dione A suspension of 100 mg. of 6-methyl-9α-fluoro-11β-hydroxy-16α-methyl-17α-ethoxy-21-fluoro-4-pregnene - 3, 20-dione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 6-methyl-9α-fluoro-11β-hydroxy-16α-methyl-17α-ethoxy-21-fluoro-4,6 - pregnadiene - 3,20-dione, which is purified by chromatography.

In accordance with the foregoing procedure, but starting with 6-methyl-9α-fluoro-11β-hydroxy-16α-methyl-17α-isopropoxy-21-fluoro-4 - pregnene - 3,20- dione, the corresponding 6-methyl-9α-fluoro-11β - hydroxy - 16α - methyl-17α-isopropxy-21-fluoro-4,6-pregnadiene-3,20-dione is obtained.

Example 20.—6-methyl-9α-fluoro-16α - methyl - 17α - methoxy-4,6-pregnadiene-3,11,20-trione A suspension of 100 mg. of 6-methyl-9α-fluoro-16α-methyl-17α-methoxy-4-pregnene-3,11,20-trione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 6-methyl-9α-fluoro-16α-methyl-17α-methoxy-4,6-pregnadiene-3,11,20-trione, which is purified by chromatography.

In accordance with the foregoing procedure, but starting with 6 - methyl-9α-fluoro-16α-methyl-17α-ethoxy-4-pregnene-3,11,20-trione, the corresponding 6-methyl-9α-fluoro - 16α - methyl-17α-ethoxy-4,6-pregnadiene-3,11,20-trione is obtained.

Example 21.—6-methyl-9α-fluoro-16α-methyl-17α-ethoxy-21-fluoro-4,6-pregnadiene-3,11,20-trione A suspension of 100 mg. of 6-methyl-9α-fluoro-16α-methyl - 17α - ethoxy-21-fluoro-4-pregnene-3,11,20-trione and 200 ml. of chloranil in 2.3 ml. of ethyl acetate and 0.5 ml. of acetic acid is heated under reflux overnight, during which time it is protected by a blanket of nitrogen. The solvent is removed and the residue is dissolved in chloroform. The chloroform solution is washed with 10% aqueous sodium bisulfite solution, then with 5% aqueous potassium hydroxide solution, and finally with water. The chloroform solution is dried over sodium sulfate and concentrated to dryness under reduced pressure. The residue is 6 - methyl-9α-fluoro-16α-methyl-17α-ethoxy-21-fluoro-4,6-pregnadiene-3,11,20-trione, which is purified by chromatography.

In accordance with the foregoing procedure, but starting with 6-methyl-9α-fluoro-16α-methyl-17α-pentoxy-21-fluoro-4-pregnene-3,11,20-trione, the corresponding 6-methyl - 9α - fluoro-16α-methyl-17α-pentoxy-21-fluoro-4, 6-pregnadiene-3,11,20-trione is obtained.

The novel steroid compounds of this invention may also be prepared by using as a starting material a 17α-hydroxy-4-pregnene-3,20-dione and converting it to the corresponding 17α-hydroxy-4,6-pregnadiene-3,20-dione by reaction with chloranil in the same manner as described above. The resulting 4,6-pregnadiene steroid may be converted to the corresponding 17α-alkoxy-4,6-pregnadiene-3,20-dione according to the procedure descibed above.

This application is a continuation-in-part of application Ser. No. 151,434, filed Nov. 10, 1961.

Various changes and modifications may be made in carrying out the present invention without departing from the spirit and scope thereof. Insofar as these changes and modifications are within the purview of the annexed claims, they are to be considered as part of the invention.

What is claimed is:

1. A 3,20-diketo-17-lower alkoxy pregna-4-6-diene steroid having a 6-position substituent selected from the group consisting of hydrogen, chlorine, fluorine and methyl; a 9-position substituent selected from the group consisting of hydrogen and fluorine; an 11-position substituent selected from the group consisting of hydrogen, keto and β-hydroxy; a 16-position substituent selected from the group consisting of hydrogen, α-methyl and β-methyl; and a 21-position substituent selected from the group consisting of hydrogen and fluorine.

2. A compound according to claim 1 wherein the substituents in the 9-, 11- and 16-positions are all hydrogen atoms.

3. A compound according to claim 1 wherein the 17-lower alkoxy radical contains not more than two carbon atoms; the substituents in the 9-, 11- and 21-positions are all hydrogen; the 6-position substituent is chlorine, and the 16-position substituent is selected from the group consisting of α-methyl and β-methyl.

4. A compound according to claim 1 wherein the 17-lower alkoxy radical contains not more than two carbon atoms; the substituents in the 9-, 11- and 21-positions are all hydrogen; the 6-position substituent is methyl; and the 16-position substituent is selected from the group consisting of α-methyl and β-methyl.

5. A compound according to claim 1 wherein the 17-lower alkoxy radical contains not more than two carbon atoms; the 6-position substituents is methyl; the 9-position substituent is fluorine; the 11-position substituent is β-hydroxy; the 21-position substituent is hydrogen; and the 16-position substituent is selected from the group consisting of α-methyl and β-methyl.

6. A compound according to claim 1 wherein the 17-lower alkoxy radical contains not more than two carbon atoms; the 6-position substituent is methyl; the substituents in the 9- and 11-positions are hydrogen; the 21-position substituent is fluorine; and the 16-position substituent is selected from the group consisting of α-methyl and β-methyl.

7. A compound according to claim 1 wherein the substituents in the 6-, 9-, 11-, 16- and 21-positions are all hydrogen.

8. A compound according to claim 1 wherein the 17-lower alkoxy radical is methoxy; and the substituents in the 6-, 9-, 11-, 16- and 21-positions are all hydrogen.

References Cited

UNITED STATES PATENTS 3,280,114  10/1966  Kincl _____ 260—239.55
3,093,664  6/1963   Edwards et al. _____ 260—397.4

OTHER REFERENCES

New Paths to Steroids, Chem. and Eng. News, Sept. 16, 1957, p. 66.

ELBERT L. ROBERTS, *Primary Examiner.*

U.S. Cl. X.R.

260—397.45, 397.47, 999